US007704458B2

(12) United States Patent
Fordham

(10) Patent No.: US 7,704,458 B2
(45) Date of Patent: Apr. 27, 2010

(54) REACTION PLATE ADAPTOR APPARATUS

(75) Inventor: Martyn Fordham, Ely (GB)

(73) Assignee: Asynt Limited, Cambridgeshire (GB)

( * ) Notice: Subject to any disclaimer, the term of this patent is extended or adjusted under 35 U.S.C. 154(b) by 1028 days.

(21) Appl. No.: 11/070,729

(22) Filed: Mar. 2, 2005

(65) Prior Publication Data

US 2006/0198767 A1 Sep. 7, 2006

(51) Int. Cl.

| | |
|---|---|
| ***B01L 9/00*** | (2006.01) |
| ***B01L 3/00*** | (2006.01) |
| ***F16M 11/00*** | (2006.01) |
| ***F28D 17/00*** | (2006.01) |
| *H05B 6/00* | (2006.01) |

(52) U.S. Cl. ......................... 422/104; 422/99; 422/102; 248/694; 248/901; 165/4

(58) Field of Classification Search .................. 422/99, 422/102, 104; 219/601, 620, 621, 622; 165/4, 165/201, 902; 248/694, 901

See application file for complete search history.

(56) References Cited

U.S. PATENT DOCUMENTS 2,607,876 A * 8/1952 Johnson et al. ............. 219/521
3,356,346 A * 12/1967 Landsberger ............... 366/274
6,893,613 B2 * 5/2005 Ruediger et al. .............. 506/40
6,905,656 B1 6/2005 Ladlow et al. ................ 422/99

FOREIGN PATENT DOCUMENTS

EP 1015115 B1 7/2003

OTHER PUBLICATIONS

Website screen printout, publication date unknown, originally printed by Applicant on Feb. 2, 2005; http://www.glass-solutions.co.uk/acatalog/Online_Catalogue_HEAT_ON_Blocks_4.html.
Radleys, “Custom designed glass reaction systems”, www.radleys.co.uk, Copyright Radleys 2005, pp. 1,2.
Julabo, “Innovative Temperature Technology—The 2005 Program”, www.julabo.de, pp. 1-67.
Heidolph, “Parallel Synthesis”, Heidolph Instruments GmbH & Co. KG, www.heidolph.com, pp. 1, 2, 5-14.

* cited by examiner

*Primary Examiner*—Tony G Soohoo
*Assistant Examiner*—Dean Kwak
(74) *Attorney, Agent, or Firm*—Wiggin and Dana LLP; Anthony P. Gangemi

(57) ABSTRACT

A reaction vessel support device for mounting on a magnetic stirrer hotplate. The modular device comprises a base unit capable of positioning and seating at the reaction hotplate, and an insert formed non-integrally with the base unit comprising a reaction vessel receiving portion capable of seating and locating about a portion of a reaction vessel. At any one time, the base unit is capable of accommodating a plurality of different shaped and sized inserts each insert being configured to seat and support a specific reaction vessel of particular shape and size. The device therefore serves as a magnetic stirrer hotplate adapter.

21 Claims, 16 Drawing Sheets

REACTION PLATE ADAPTOR APPARATUS

BACKGROUND OF THE INVENTION (1) Field of the Invention

The present invention relates to a device for positioning at a reaction plate, the device being configured to seat a reaction vessel at the reaction plate.

(2) Description of the Related Art

Laboratory based chemical reactions are typically carried out in a reaction vessel and where the reaction medium is liquid based, the reaction vessel is typically a round bottomed glass flask, commonly borosilicate, which is sold under the brand name Pyrex® by Corning of Corning, N.Y.

In order to drive the reaction heat is supplied to the reaction vessel which in turn transfers the heat to the reaction medium. The common bunsen burner represents one of the more primitive sources of heat used in the laboratory to heat reaction vessels. A further example is the commonly used oil bath in which the oil is heated by heating elements located within the bath. Oil baths have found particular use where elevated temperatures are required.

When used within a laboratory environment, the naked flame of the bunsen burner is particularly hazardous as it may serve as an ignition source for flammable solids, liquids or vapour. Oil baths pose a number of significant hazards. Firstly, the viscosity of the oil decreases when heated and spillage or splattering of the heated oil commonly results in skin burns or provides an ignition source. However, one of the more frequent accidents associated with oil baths stems from overheating of the oil resulting in ignition or explosion.

Hotplates and hotplate stirrers have been available for sometime and represent significantly safer laboratory heat sources. Hotplate stirrers operate by generating a rotating electromagnetic field in the region of the hotplate which induces a rotation effect on a magnetised stirring bar positioned within the liquid to be stirred. Resistance heating elements positioned in contact with the hotplate provide a means for heating the substantially planar working surface. Heat is supplied from the hotplate either directly to the reaction vessel, in contact with the hotplate, or via a liquid, typically an oil bath, positioned on the hotplate working surface. When used in combination with an oil bath, the significant risks posed to laboratory personnel remerge. Where a liquid/oil bath is not used the limited surface contact area between the planar hotplate and the curved flask provides for inefficient heat transfer and a limited heating effect.

One known device includes an adapter block constructed from aluminum or stainless steel for positioning over a stirrer hotplate. The adapter block comprises a plurality of recesses, each recess being configured to seat and partially house a reaction vessel. As a result of the extended surface contact area between the adapter block and reaction vessel, heat generated by the hotplate is efficiently transferred to the reaction medium within the reaction vessel.

The known device described above is specifically designed for parallel synthesis involving the simultaneous heating and stirring of multiple reaction vessels positioned outside the perimeter of the hotplate. This known adapter block is specifically designed for use with test tube or boiling tube type reaction vessels having a substantially elongate shape. Additionally, as the reaction vessels are located outside the perimeter of the reaction plate the rotational effect imparted to the magnetised stirring bar within each reaction vessel is reduced. This may be a particular problem where the reaction medium is particularly viscous.

BRIEF SUMMARY OF THE INVENTION

The inventors provide a reaction vessel support device configured for positioning at a reaction plate, the device being adaptable and configured to receive and support a single or a plurality of reaction vessels of different shapes and dimensions. The device of the present invention is modular, being constructed from separate and interchangeable components. In particular, a base unit capable of positioning at the reaction plate is configured to mate with an insert selected from a set of inserts, each respective insert being configured to seat a different shaped and/or sized reaction vessel.

The base unit may comprise a single recessed portion positioned within the base unit so as to be aligned directly over the reaction plate such that the majority of the recessed portion is located within the perimeter of the reaction plate. An insert selected from the range of different inserts is capable of seating within the recessed portion. Effective heat transfer is provided between insert and base unit due to the shape and dimensions of an exterior surface of the insert corresponding to the shape and dimensions of the recessed portion of the base unit. In particular, the distance between the insert and recessed portion, in the region of the recess, may be within the range 0 to 5 mm.

As the recess, the insert and hence the reaction vessel are aligned centrally with respect to the heating plate an enhanced heating effect is achieved over similar known devices in which the reaction vessels are positioned off centre. Additionally, effective stirring of the reaction medium is also possible, particularly where viscous liquids are used due to this centralised location of the reaction vessel within the magnetic field generated over the reaction plate.

According to a first aspect of the present invention there is provided a reaction vessel support device for positioning at a reaction plate, said device comprising: a base unit capable of positioning in contact with said reaction plate; an insert formed non-integrally with said base unit, said insert comprising at least one reaction vessel receiving portion capable of seating and locating about a portion of a reaction vessel; and a single recessed portion formed in said base unit capable of seating and locating about said insert, said recessed portion positioned at said base unit such that said insert is located substantially centrally relative to said reaction plate.

Preferably, the shape and dimensions of a convex surface region of said insert configured for locating within said recessed portion correspond substantially to the shape and dimensions of the concave recessed portion of the base unit.

Preferably, a shape of said insert and said recessed portion are configured such that a distance between said recessed portion and said insert, in the region of said recessed portion, is substantially uniform. The distance between the convex surface region of the insert and the surface of the recessed portion may be substantially zero or the insert and base unit may be configured to provide a gap distance of up to 5 mm.

Preferably, the recessed portion is dish or bowl shaped being defined by at least one side wall and a base.

Preferably, each insert comprises a single reaction vessel receiving portion capable of seating and locating about a portion of a single reaction vessel. Alternatively, each insert may comprise a plurality of reaction vessel receiving portions wherein each insert is capable of seating a plurality of reaction vessels.

Each insert and in particular the reaction vessel receiving portion may be designed to seat and locate about a reaction vessel of specific size and shape. Accordingly, via the inserts, the reaction plate adapter of the present invention may be configured to support independently round bottom flasks of sizes of 25 ml, 50 ml, 100 ml, 250 ml, 500 ml, 1 L, 2 L or 3 L. Additionally, the inserts may be configured to receive and support reaction flasks of any shape commonly used within the laboratory environment. The present invention is also configurable for use with sealable high pressure reaction vessels.

A lip may be provided at the insert configured for seating at an upper region of the recessed portion whereby the insert may be suspended within the recess by the lip. The lip may be annular or may be discontinuous possibly in the form of radially extending projections.

Preferably, the device comprises location means provided at said base unit capable of seating said base unit in position at the reaction plate. The location means is capable of inhibiting lateral displacement of the device relative to the stirrer hotplate.

A lower surface of the device may comprise a central cavity corresponding in size and shape to the reaction plate. Accordingly, the reaction plate is configured to locate partially within the cavity so as to ensure the device is effectively located in position. Alternatively, location feet or projections may be provided towards the underside of the base unit for abutting against the reaction plate and releasably locking the device in position. In particular, the location feet or projections may be removeably connected to the base unit, for example being screwed into the underside surface. Accordingly, a user may detach and reattach the location feet at the base unit enabling the device for use with reaction plates of different sizes and shapes. For example, a square reaction plate may require four location feet provided at the underside surface of the base unit whilst three location feet would be sufficient to secure the device in position at a substantially circular reaction plate.

Preferably, an underside surface of the base unit comprises means to enable the location feet to be secured at a plurality of different positions on the underside surface such that the location means is adaptable and may be configured specifically by a user to allow the device to be secured to any one of a plurality of different shaped and sized reaction plates.

The base unit and insert of the present invention may be made of any chemically resistant material including for example a polymer based compound, a metal, in particular aluminium or a metal alloy, in particular stainless steel. Additionally, the material of the present invention is chosen to provide efficient heat transfer from the reaction plate to the reaction vessel.

According to a second aspect of the present invention there is provided a device for positioning at a reaction plate configured to support at least one reaction vessel, said device comprising: a base unit capable of positioning in contact with said reaction plate; an insert formed non-integrally with said base unit, said insert comprising a dish-like configuration having a concave surface region and a convex surface region, wherein said concave region of said insert is capable of seating and locating about a portion of a reaction vessel; and a single recessed portion formed substantially centrally within said base unit capable of seating and locating about said convex portion of said insert.

Accordingly, due to the single recessed portion being formed substantially centrally within the base unit, the reaction vessel, when seated at the insert, may be positioned substantially centrally within the perimeter of the upper surface of the reaction plate.

According to a third aspect of the present invention there is provided an adapter block device for a stirrer hotplate, said device comprising: a base unit capable of seating on said reaction plate, said base unit comprising an internal bowl-like cavity, formed substantially centrally within said base unit, said cavity comprising side walls and a base; and a dish-like insert comprising at least one concave surface region capable of seating and locating about a portion of a reaction vessel, and a convex surface region configured to mate with said bowl-like cavity of said base unit, wherein said insert is capable of being removeably accommodated within said base unit.

The device of the present invention is capable of fitting to a magnetic stirrer, a hotplate or a magnetic stirrer hotplate of the kind typically used in a laboratory environment.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE INVENTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Within this specification, the term 'reaction plate' includes a magnetic stirrer plate; a hotplate and; a magnetic stirrer hotplate typically found within the art and used within a laboratory environment to provide heat or a stirring effect to a reaction medium housed within a reaction vessel.

Within this specification, reference to the central positioning of the flask, insert or recessed portion of the base unit relative to the reaction plate includes an alignment of a central point of the flask, insert or recessed portion with a central point of the reaction plate. Additionally, 'centrally' includes the relative positioning of the flask, insert or recessed portion within the perimeter of the reaction plate such that the majority of the flask, insert or recessed portion is positioned within the perimeter of the reaction plate.

Figure 1:
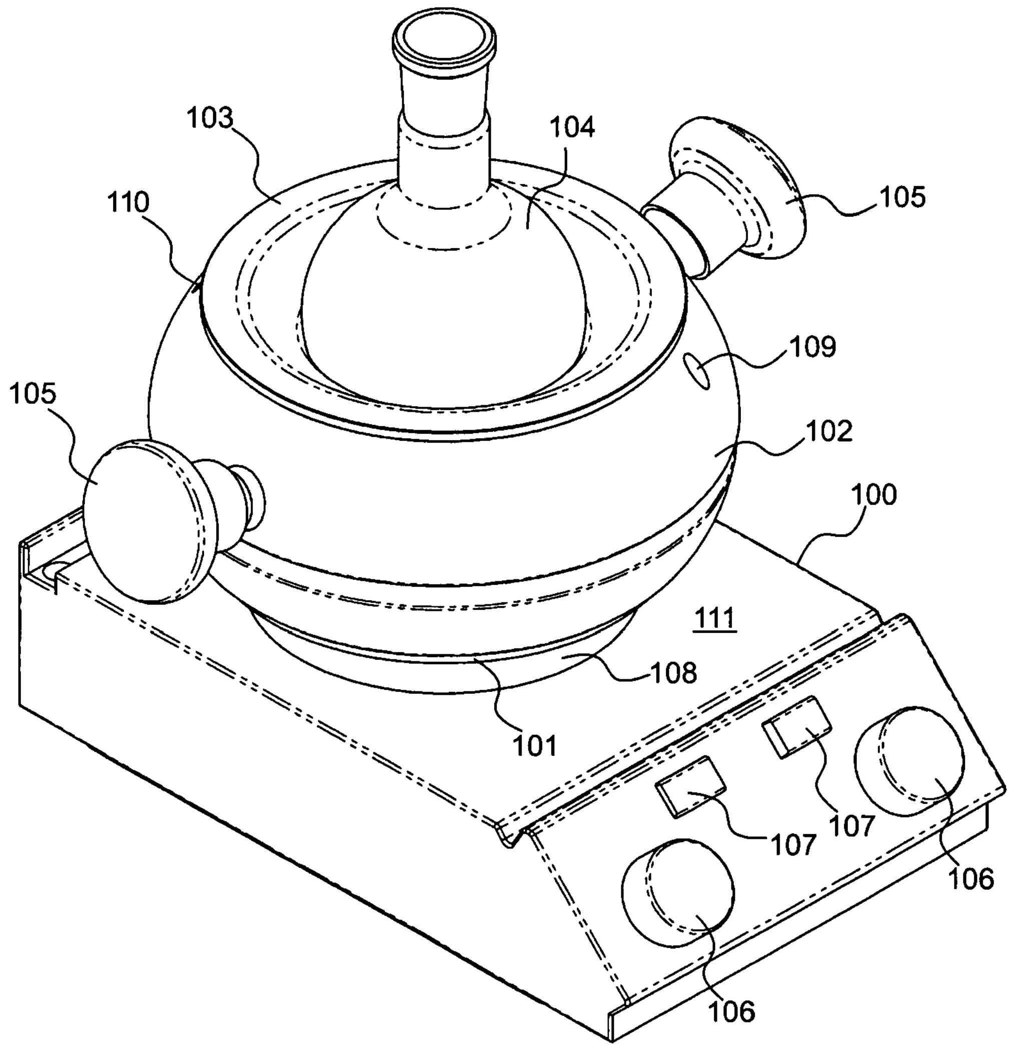
FIG. 1 herein is a perspective view of a reaction vessel support device mounted on a magnetic stirrer hotplate according to a specific implementation of the present invention.
Figure 2:
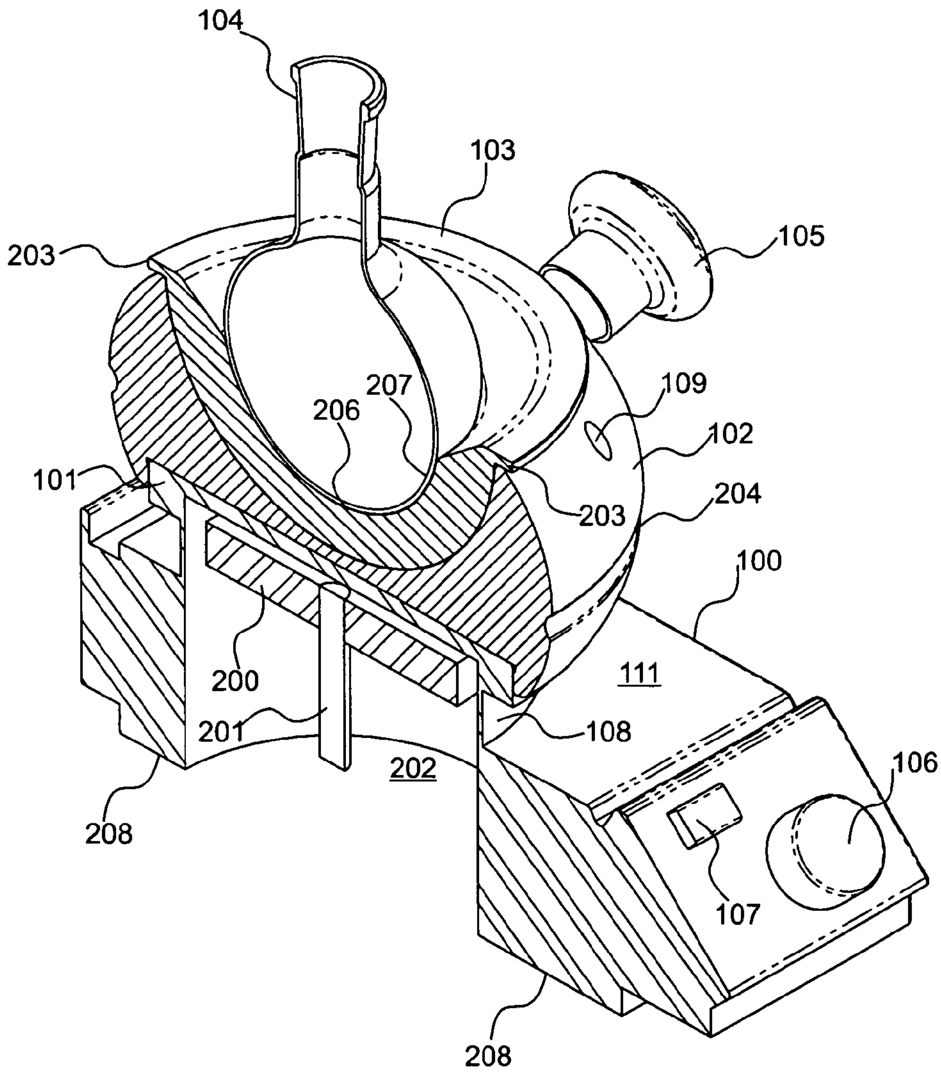
FIG. 2 herein is a cross sectional perspective view of the device and hotplate of FIG. 1 herein.

FIG. 1A herein illustrates a perspective view of the reaction vessel support device according to the specific implementation of the present invention and FIG. 2 herein illustrates a cross sectional perspective view of the device.

Referring to FIGS. 1 and 2 herein, reaction station 100 comprises a reaction plate 101 comprising a substantially circular upper working surface (not shown). Reaction plate 101 is formed at one end of a neck portion 108 extending from a substantially rectangular upper surface 111 of reaction station 100. Suitable control means are provided 106, 107 allowing a user to adjust the heating effect provided at hotplate 101 and control the extent of the magnetic field generated in the region of the hotplate.

The reaction vessel support device comprises a base unit 102 comprising a bowl-like configuration in which a central recessed portion (not shown) accommodates a dish-like insert 103. A reaction flask 104 is seated within and supported by insert 103 via a concave receiving portion 206 corresponding in shape, dimension and/or curvature to an exterior, lower portion of reaction vessel 207.

Insert 103 comprises an annular lip portion 203 located at an upper region of the concave inner surface 206. Lip 203 is configured to seat onto an upper portion of the recessed portion of base unit 102 whereby insert 103 may be suspended via lip 203. According to the specific implementation of the present invention a gap of substantially 2 mm is provided between the outer convex surface region of the dish-like insert and the surface region of the recessed portion provided within base unit 103.

Two handles 105 are provided at base unit 102, the handles being positioned at opposite sides of the base unit substantially opposed to one another. Each handle comprises a projection (not shown) comprising screw threads configured to mate with corresponding screw threads (not shown) provided within unit 102.

A slim elongate cavity 109 is provided in an upper region of base unit 102 configured to receive and accommodate a portion of a liquid filled thermometer. A similar additional cavity is provided 110 configured to receive and accommodate an electronic temperature probe, being for example a metal-resistance thermometer.

Referring to FIG. 2 herein a magnet 200 is housed within a cavity 202 extending from an underside surface 208 of reaction station 100 to the reaction plate 101. A spindle 201 connects magnet 200 to a motor (not shown) whereby magnet 200, positioned directly below reaction plate 101, is rotatable in the plane of plate 101 so as to generate a magnetic field within the region of reaction station 100. A magnetised stirrer bar (not shown) accommodated within reaction vessel 104 is caused to rotate in response to the magnetic field.

Base unit 102 comprises an annular groove 204 formed within its exterior surface positioned midway between an upper and lower portion. Groove 204 is configured to receive suitable means for locating a heat shield at the exterior surface of base unit 102. The heat shield is configured to conceal substantially the entire external surface of unit 102 and is preferably manufactured from a thermally insulating material.

Figure 3:
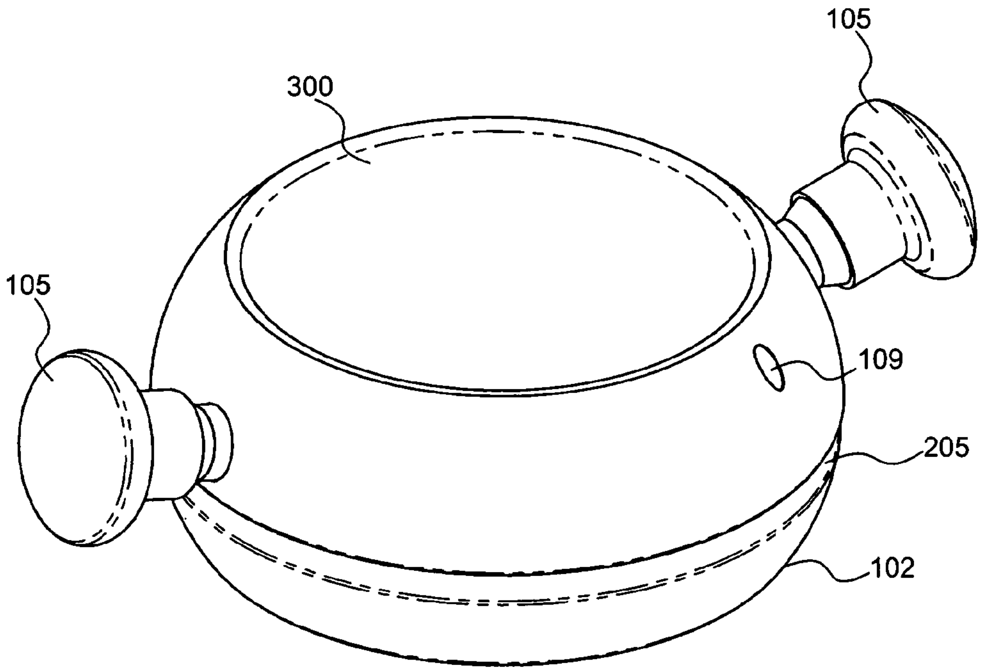
FIG. 3 herein is perspective view of the device of FIG. 1 herein.
Figure 4:
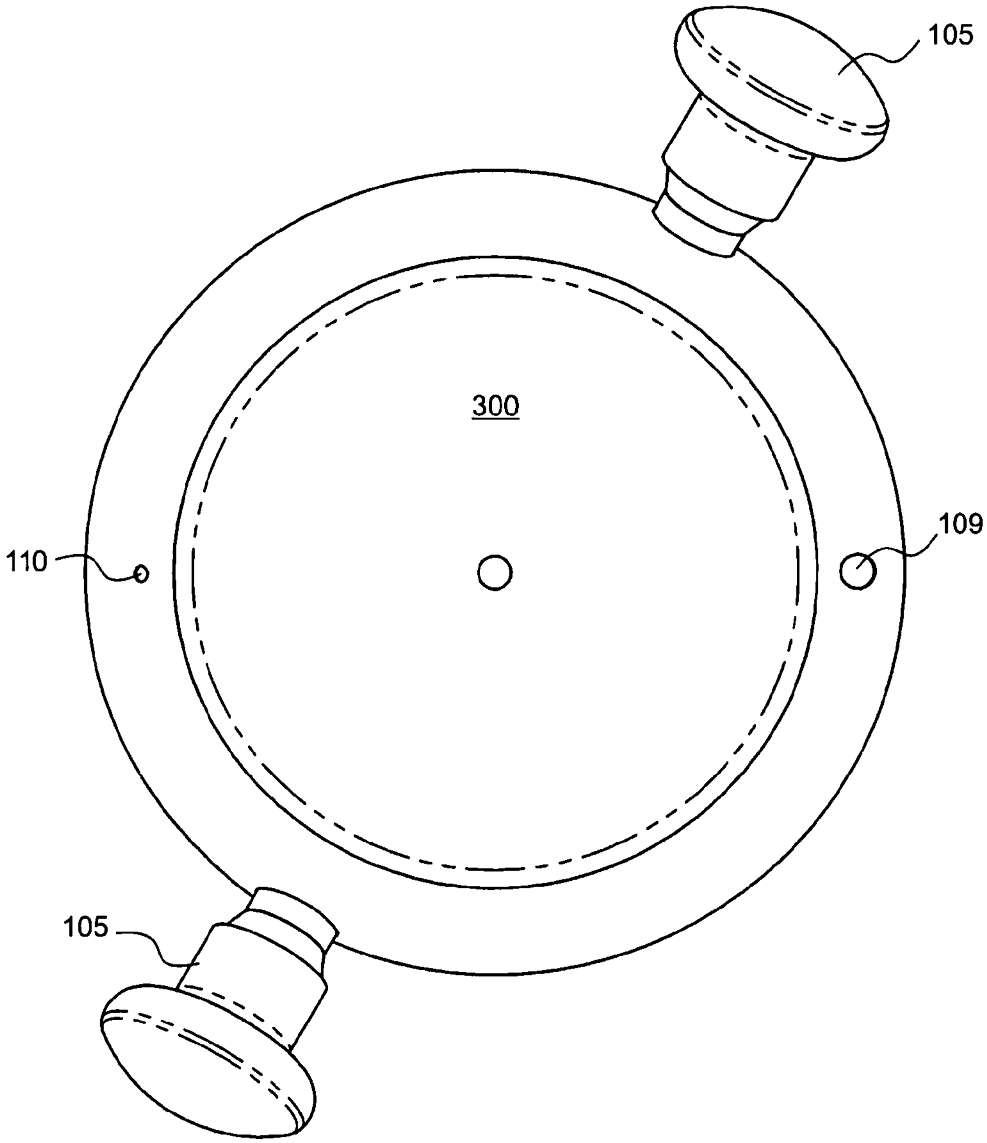
FIG. 4 herein is a plan view of the device of FIG. 1 herein.
Figure 5:
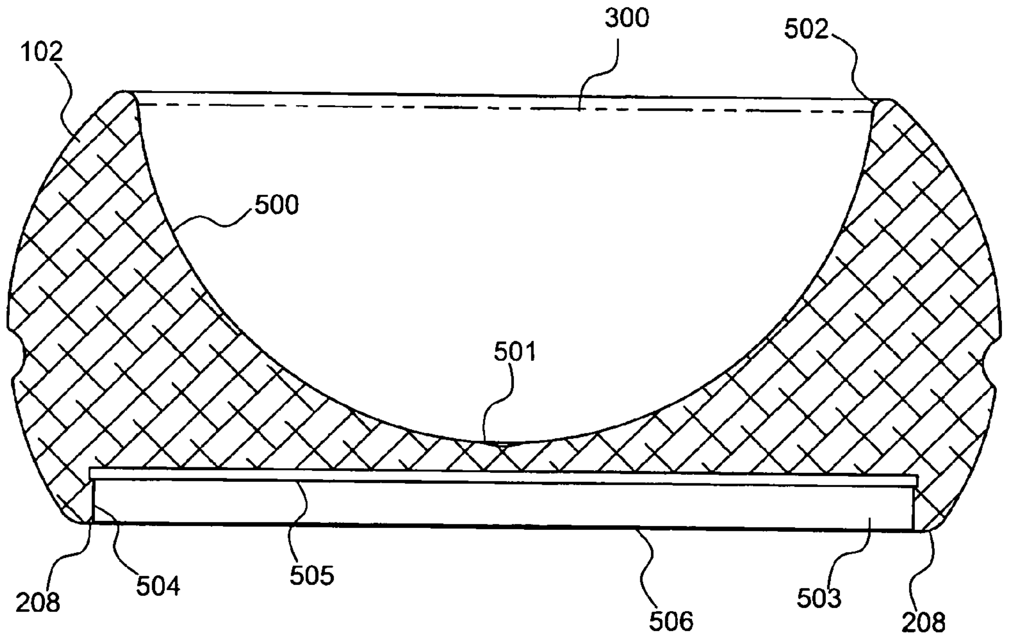
FIG. 5 herein is a cross sectional side elevation view of the device of FIG. 1 herein.

FIGS. 3, 4 and 5 herein illustrate respectively a perspective view, a plan view and a cross sectional side elevation view of the base unit 102 of FIGS. 1 and 2 herein.

Base unit 102 comprises a substantially centrally positioned recessed portion 300 extending inwardly from an upper region towards a lower region to define a bowl-like cavity. With reference to FIG. 5 herein the recessed portion 300 comprises an annular side wall 500 extending towards the lower region of a base unit to form a cavity base 501. The internally concave recessed portion 300 borders, at an upper region, the outer surface of the base unit via an annular chamfered section 502. This upper region and/or chamfered section 502 is configured to seat annular lip 203 (FIG. 2) so as to suspend insert 103 within recessed portion 300.

A further cavity 503 is provided at a lower region of base unit 102. Cavity 503 comprises a substantially cylindrical configuration being open at one end 506, at bottom surface 208 of base unit 102. Cavity 503 is defined by annular wall 504 extending inwardly from base surface 208 towards the substantially circular innermost wall 505 positioned directly underneath recessed portion 300. Via cavity 503, base unit 102 is capable of seating at the reaction plate (FIG. 2) whereby lateral movement of base unit 102 is impeded or preferably prevented. Base unit 102 may be displaced from reaction plate 101 by a user grasping handles 105 and lifting the device upwardly in a direction perpendicular to surface 111 of reaction station 100.

Figure 6A:
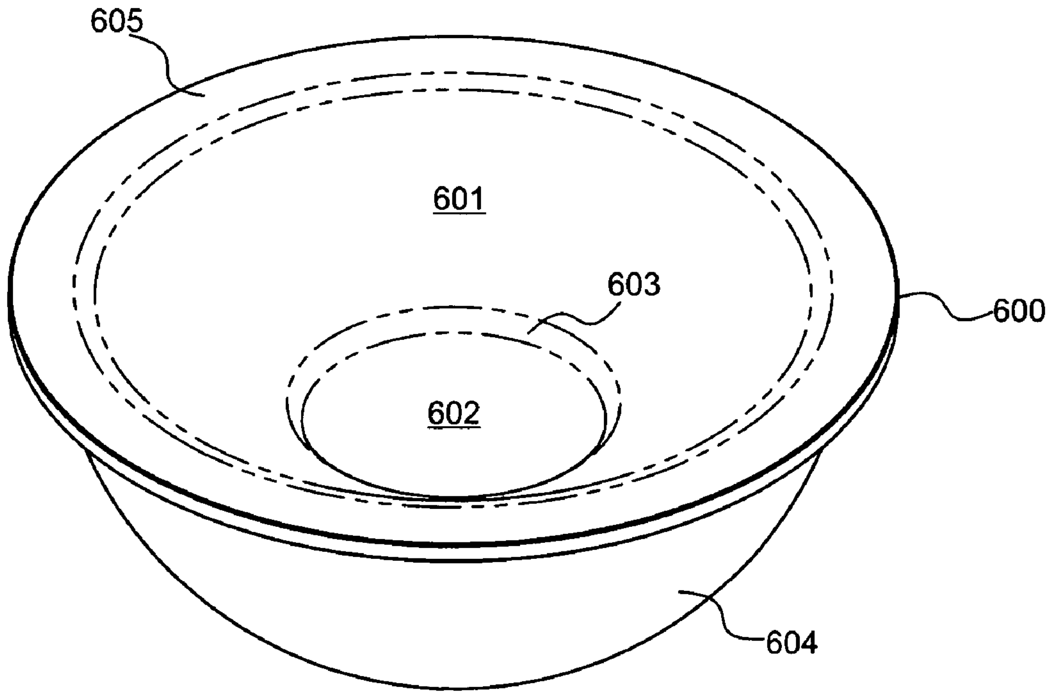
FIG. 6A is a perspective view of an insert capable of use with the device of FIG. 1 herein.
Figure 6B:
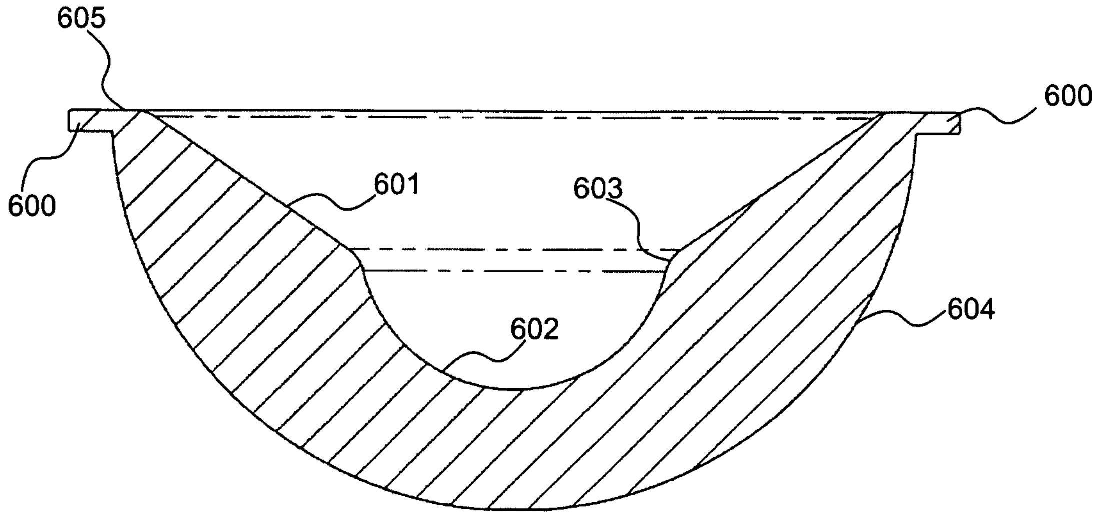
FIG. 6B herein is a cross sectional side elevation view of the insert of FIG. 6A herein.

FIGS. 6A and 6B illustrate a perspective view and cross sectional side elevation view of an insert capable of seating within recessed portion 300. The dish-like insert comprises an internally concave surface region 601, 602, 603 and an externally convex surface region 604 having a profile corresponding to a segment of a sphere. A portion of the inner, concave region comprises reaction vessel receiving portion 602 capable of seating and locating about a lower portion of a reaction vessel or flask 104. The curved vessel receiving portion 602 is bordered at its uppermost region 603 by an annular inclined wall 601 tapering outwardly from the concave bowl 602 towards an upper region of the insert. The tapered annular wall 601 terminates at an annular upper surface 605 which defines a portion of annular lip 600.

Figure 7A:
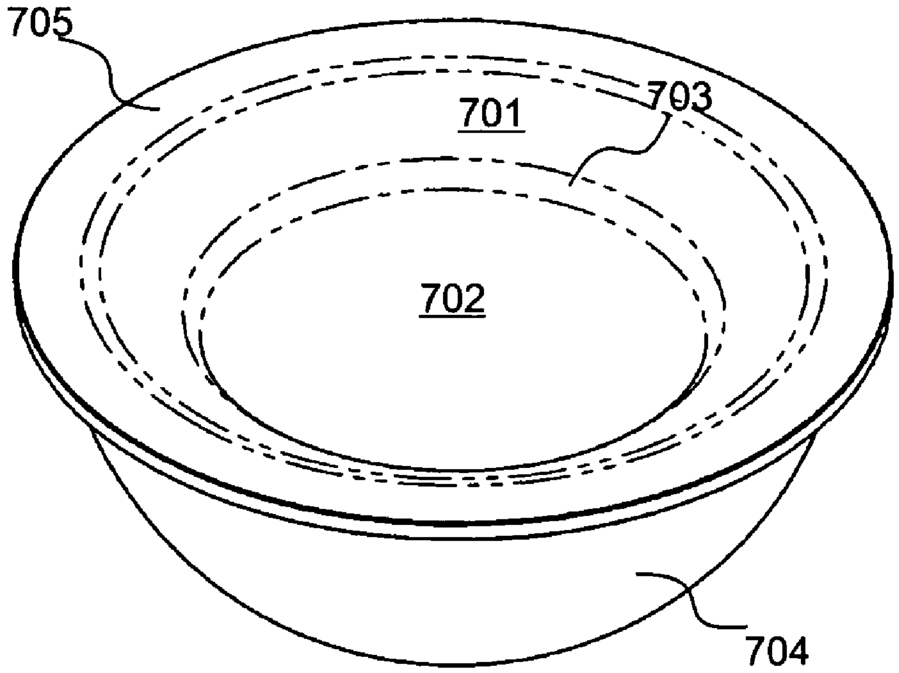
FIG. 7A herein is a perspective view an insert capable of use with the device of FIG. 1 herein.
Figure 7B:
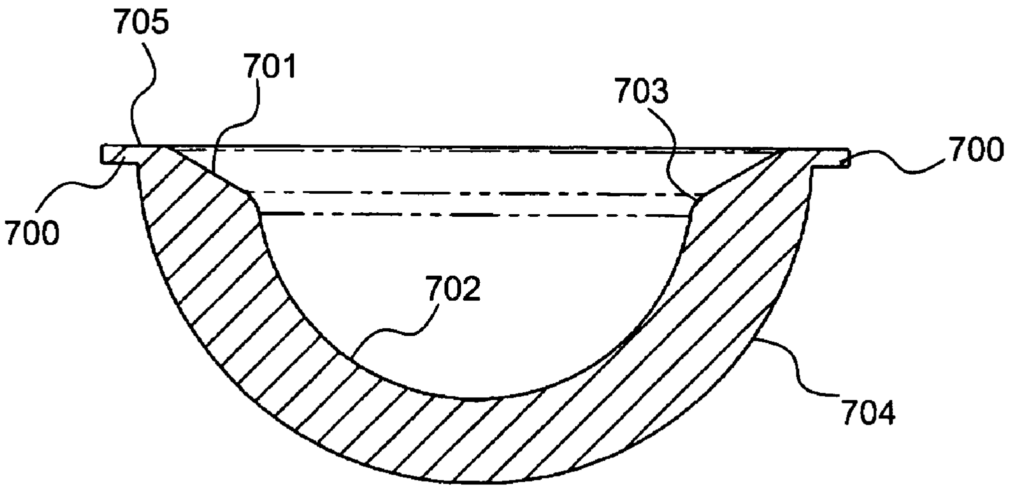
FIG. 7B herein is a cross sectional side elevation view of the insert of FIG. 7A herein.
Figure 8A:
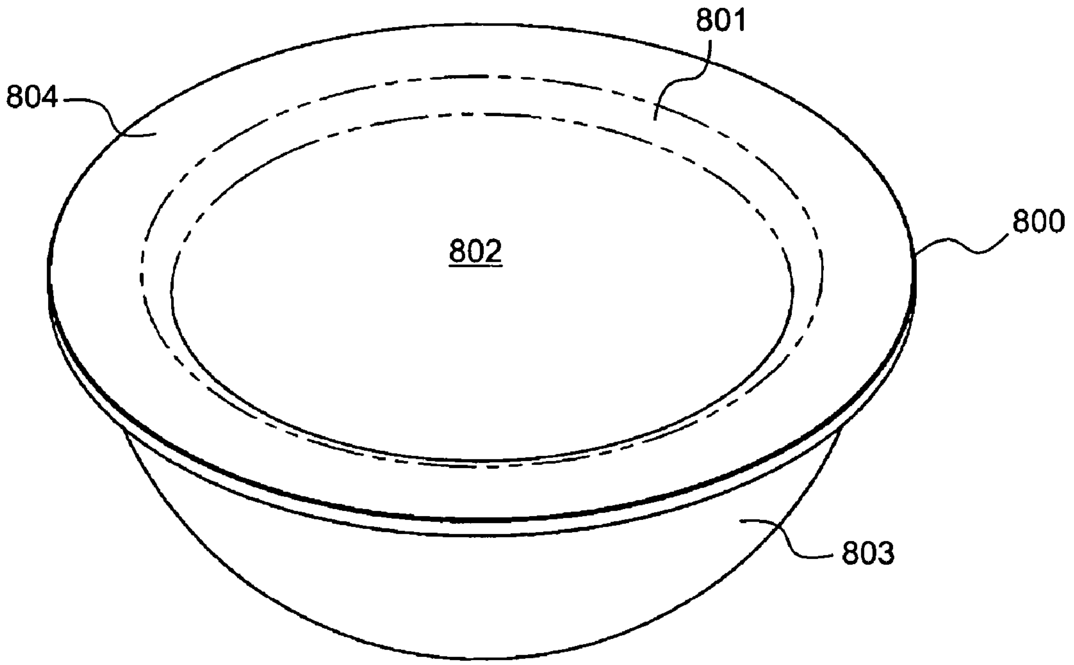
FIG. 8A herein is a perspective view of an insert capable of use with the device of FIG. 1 herein.
Figure 8B:
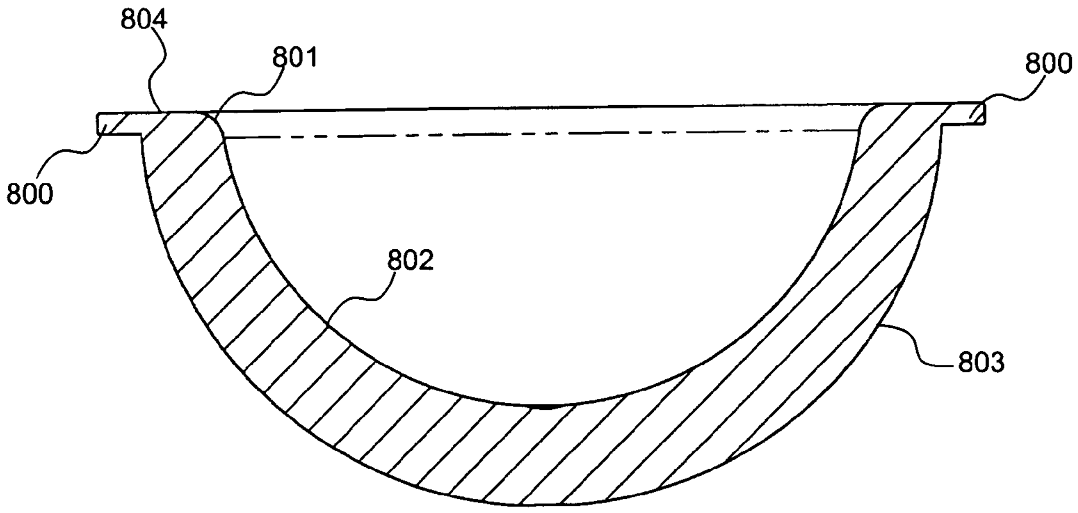
FIG. 8B herein is a cross sectional side elevation view of the insert of FIG. 8A herein.

FIGS. 7A and 7B herein illustrate a perspective view and cross sectional side elevation view of a slightly modified version of the insert of FIGS. 6A and 6B herein. The insert of FIGS. 7A and 7B herein is configured for supporting a larger reaction vessel than that of the insert of FIGS. 6A and 6B herein. In particular, a radius of curvature of concave reaction vessel receiving portion 702 is greater than region 602 such that a vessel of larger width or diameter may be accommodated within the insert. Similarly, FIGS. 8A and 8B herein illustrate a further variation of insert configured to accommodate a larger reaction vessel than the insert of FIGS. 7A, 7B and 6A, 6B herein. The radius of curvature of vessel receiving portion 802 is greater than that of the respective receiving portions 702, 602. Additionally, the depth of the vessel receiving portion 802 of the insert of FIG. 8 herein is greater than that of the insert of FIGS. 7A, 7B and 6A, 6B herein.

The annular tapered side wall 601, 701 allows enhanced visibility of the reaction flask and hence the flask contents when seated within the insert and positioned at the device.

Figure 9:
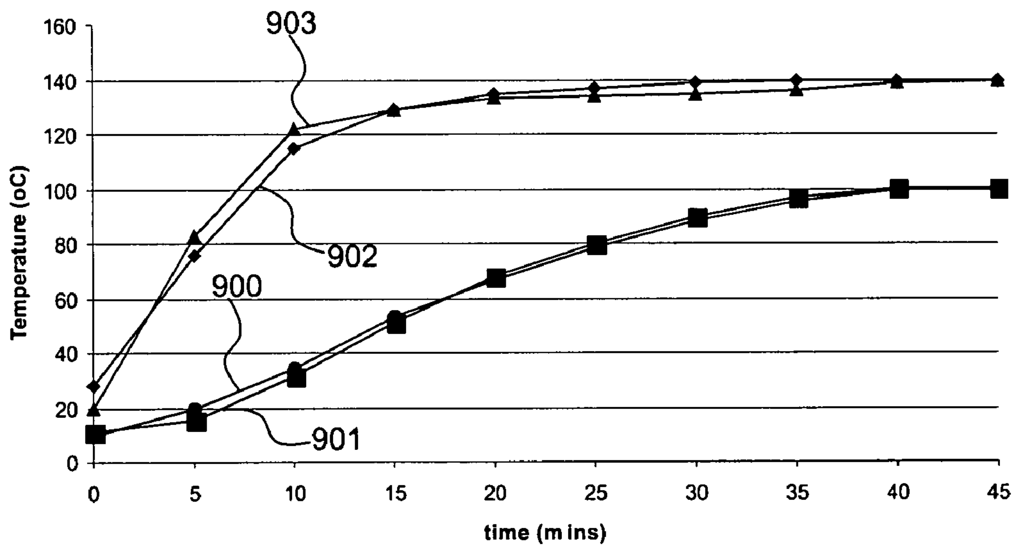
FIG. 9 herein is a graph of the heat transfer performance of the device of the present invention compared with a conventional oil bath.

FIG. 9 herein illustrates the heating performance of the base unit according to the specific implementation of the present invention comprising an insert configured to seat a 1 litre flask. The heating performance was evaluated using a fuzzy logic temperature controller both in the block and in the flask. The flask was filled with water to half the total flask volume. The water was stirred using an electrical stirring bar and the oil bath was stirred using a cross shaped stirring bar. Temperatures were measured via the fuzzy logic probe and a separate temperature check thermometer as appropriate. A Heidolph oil bath and a Heidolph MR 3001 K stirring hotplate were used.

The fuzzy logic probe, positioned within the base unit and the oil bath, was set to 140° C. The internal flask temperature was monitored by the temperature check thermometer.

Curve 900 represents the temperature of the water within the flask supported by the present invention; curve 901 represents the temperature of the water within the flask partially submerged within the oil bath; curve 902 represents the temperature of the base unit and; curve 903 represents the temperature of the oil within the oil bath.

As illustrated, the reaction vessel support device and the oil bath behave very similarly as confirmed by the change in temperature over time of both the base unit/oil bath and the water in both flasks. Both the device of the present invention and the oil bath brought the water, within the flask, to the boil after approximately 39 minutes.

Figure 10:
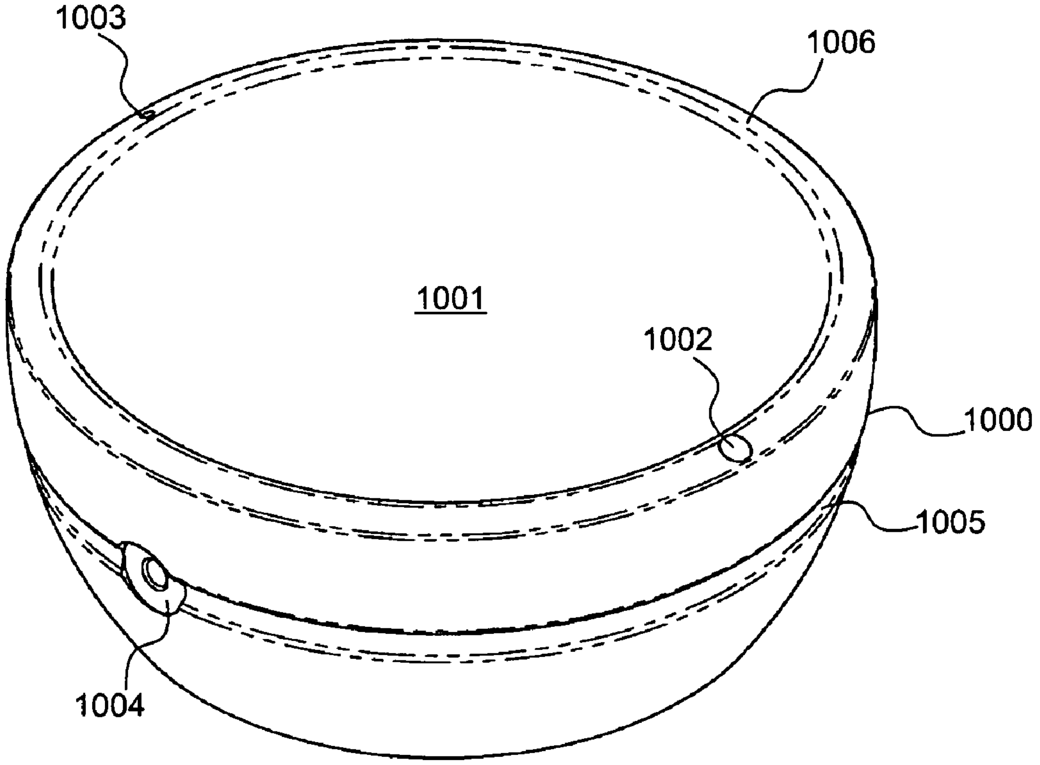
FIG. 10 herein is a perspective view of a further specific implementation of the device of FIG. 1 herein.
Figure 11:
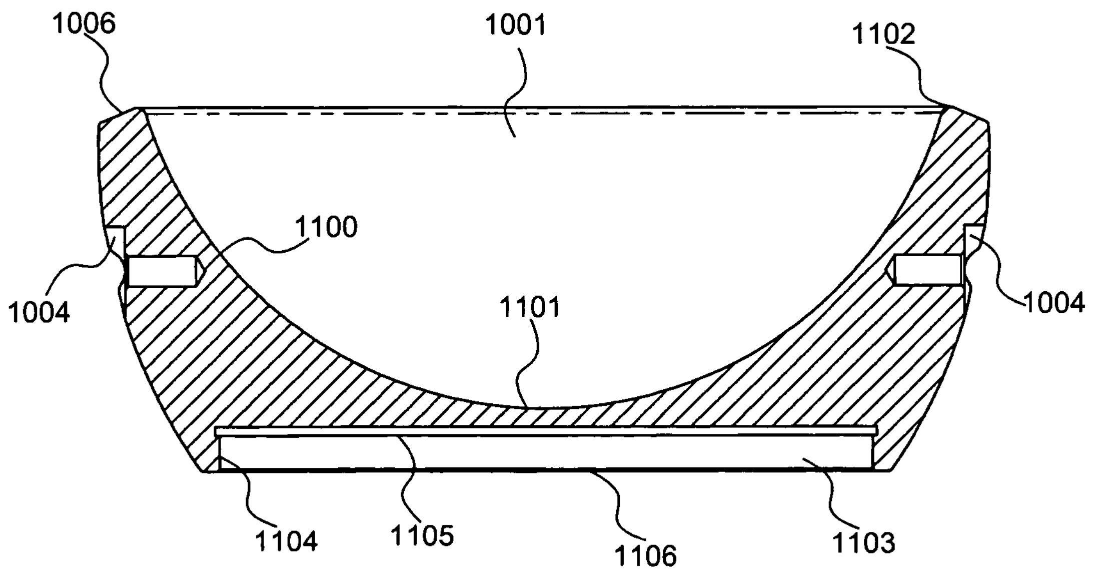
FIG. 11 herein is a cross sectional side elevation view of the device of FIG. 10 herein.

FIGS. 10 and 11 herein illustrate respectively perspective and cross sectional side elevation views of a further specific implementation of the base unit of FIGS. 1 to 5 herein. The base unit 1000 comprises centralised cavity 1001 being defined by concave wall 1100 and base 1101. Annular rim 1006 borders the cavity opening and comprises recessed portions 1002, 1003 configured to receive a thermometer and temperature probe, respectively. Handle receiving means 1004 are provided through the body of the base unit for receiving handles 105 (not shown) annular groove 1005 extending around the perimeter of the base unit is capable of receiving the heat shield as described with reference to FIGS. 1 to 4 herein. Cavity 1103 being defined by walls 1104, 1105 is capable of locating about hotplate 101 received through open end 1106 as detailed with reference to FIG. 5 herein.

Figure 12A:
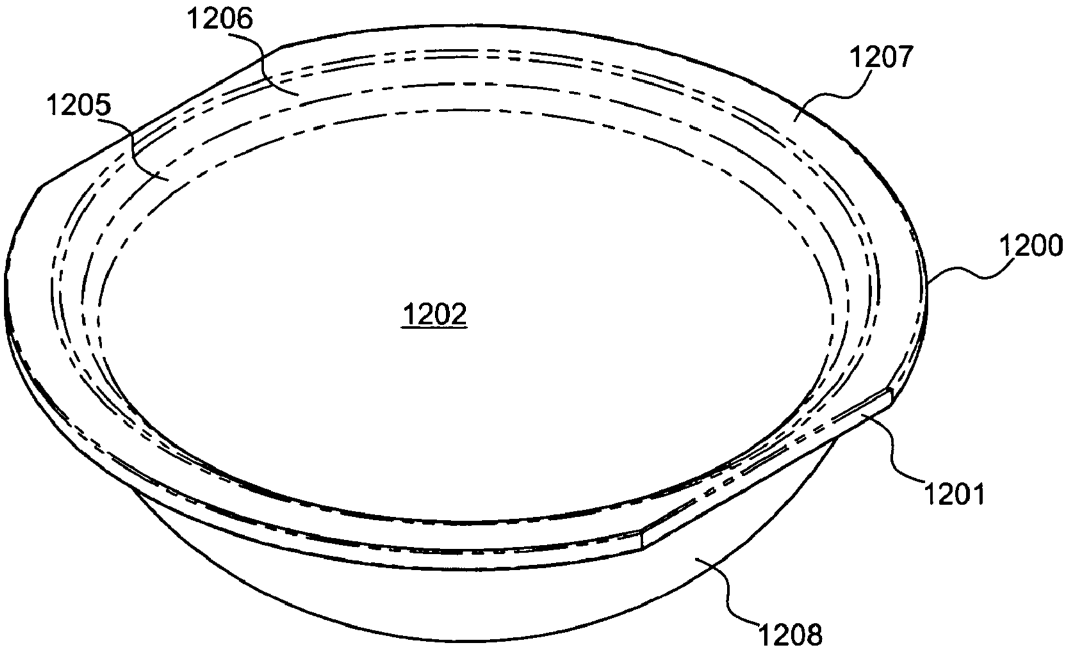
FIG. 12A herein is a perspective view of an insert capable of use with the device of FIG. 10 herein.
Figure 12B:
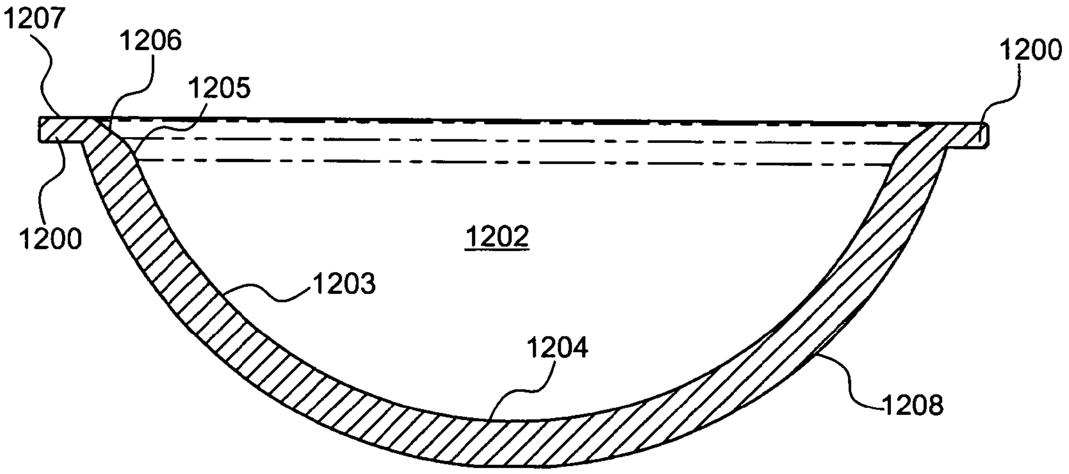
FIG. 12B herein is a cross sectional side elevation view of the insert of FIG. 12A herein.

FIGS. 12A and 12B herein illustrate respectively a perspective view and a cross sectional side elevation view of an insert configured for seating within the base unit of FIGS. 10 and 11 herein. The insert comprises internally concave surface region 1202 being defined by annular side wall 1203 and base 1204. Side wall 1203 is bordered at its upper region by outwardly tapering annular side wall 1206 positioned between an upper flat annular surface 1207 and an annular end region 1205 of curved wall 1203. Lip 1200 is configured for positioning and seating at upper surface 1006 of the base unit. The exterior, convex, bowl-like surface 1208 comprises a curvature configured to correspond to that of the cavity 1001 of base unit 1000.

Annular lip 1200 comprises two cut-out sections 1201 positioned opposed to one another wherein when insert is seated within recessed portion 1001 thermometer receiving means 1002, 1003 are not concealed.

According to further specific implementations of the present invention cavity 503, 1103 may be replaced by a plurality of, in particular three or four, projections extending from lower surface 208. The projections, distributed around the perimeter of surface 208, are spaced apart sufficiently such that each projection is configured to grip the perimeter of the hotplate 101 as the base unit is seated at reaction station 100.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A support device for centering a reaction vessel on an upper surface of a stirrer hotplate, said device comprising:

a base unit including a substantially centrally positioned recessed portion defining an annular side wall that extends inwardly from an upper region towards a lower region and a base, said lower region including a cylindrical cavity formed at an underside of said base unit, said cylindrical cavity being open at one end capable of receiving and locating over and about said upper surface of said stirrer hotplate, said cylindrical cavity being positioned below said recessed portion, said cylindrical cavity being concentrically aligned with said recessed portion, said cylindrical cavity being configured for substantially centering said base unit on said upper surface of said stirrer hotplate; and an insert formed non-integrally with said base unit, said insert being configured to seat within but at a distance above said recessed portion so that said insert is concentrically aligned with said recessed portion and said cylindrical cavity, wherein said distance is a gap greater than zero, said insert comprising at least one reaction vessel receiving portion capable of seating and locating about a portion of a reaction vessel, wherein said insert and said base unit are solid.

2. The device as claimed in claim 1 wherein the shape and dimensions of a surface of said insert are configured for locating within said recessed portion and correspond substantially to the shape and dimensions of said recessed portion.

3. The device as claimed in claim 1 wherein said distance between said recessed portion and said insert, in the region of said recessed portion, is substantially uniform.

4. The device as claimed in claim 1 wherein said recessed portion is dish shaped.

5. The device as claimed in claim 1 wherein said recessed portion is positioned substantially within a perimeter of said reaction plate.

6. The device as claimed in claim 1 wherein said insert seated at said recessed portion is positioned substantially within a perimeter of said reaction plate.

7. The device as claimed in claim 1 wherein said insert comprises a single reaction vessel receiving portion capable of seating and locating about a portion of a reaction vessel.

8. The device as claimed in claim 1 wherein said insert comprises a plurality of reaction vessel receiving portions, each receiving portion capable of seating and locating about a portion of a reaction vessel.

9. The device as claimed in claim 1 wherein said insert further comprises a lip portion capable of seating at a perimeter of said recessed portion.

10. The device as claimed in claim 9 wherein said lip portion is an annular lip.

11. The device as claimed in claim 1 wherein said base unit and said insert are manufactured from aluminum.

12. The device as claimed in claim 1 further comprising at least one handle positioned at an exterior surface of said base unit.

13. The device as claimed in claim 1 further comprising means to receive and partially house a thermometer.

14. A device for centering and supporting at least one reaction vessel on a stirrer hotplate, said device comprising:

a base unit including a substantially centrally positioned recessed portion defining an annular side wall that extends inwardly from an upper region towards a lower region, said lower region including a cylindrical cavity formed at an underside of said base unit, said cylindrical cavity being open at one end capable of receiving and locating over and about said upper surface of said stirrer hotplate, said cylindrical cavity being positioned below said recessed portion, said cylindrical cavity being concentrically aligned with said recessed portion, said cylindrical cavity being configured for substantially centering said base unit on said upper surface of said stirrer hotplate; and an insert formed non-integrally with said base unit, said insert being configured to seat within said recessed portion so that said insert is concentrically aligned with said recessed portion and said cylindrical cavity, said insert comprising a dish-like configuration having an internally curved surface region and an externally curved surface region, wherein said internally curved region of said insert is capable of seating and locating about a portion of a reaction vessel and said externally curved surface region is capable of seating within but at a distance above said recessed portion, wherein said insert and said base unit are solid.

15. The device as claimed in claim 14 wherein a curvature of said recessed portion of said base unit corresponds in shape to a curvature of said externally curved surface region of said insert.

16. The device as claimed in claim 14 wherein said distance between said recessed proportion and said externally curved surface region of said insert is substantially uniform within said recessed portion.

17. The device as claimed in claim 14 wherein said recessed portion of said base unit comprises side walls and a base.

18. The device as claimed in claim 14 further comprising means to inhibit lateral movement of said base unit when said base unit is positioned on said stirrer hotplate.

19. The device as claimed in claim 14 wherein said insert further comprises an annular lip positioned at the junction between said internally curved surface region and said externally curved surface region, said lip capable of seating at a perimeter of said recessed proportion to suspend said insert substantially within said recessed portion.

20. An adapter block device for a stirrer hotplate, said device comprising:

a base unit including a substantially centrally positioned internal bowl-like cavity, said internal bowl-like cavity including side walls, said side walls extending inwardly from an upper region towards a lower region, said lower region including a cylindrical cavity formed at an underside of said base unit, said cylindrical cavity being open at one end and capable of receiving and locating over and about said upper surface of said stirrer hotplate, said cylindrical cavity being positioned below said internal bowl-like cavity, said cylindrical cavity being concentrically aligned with said internal bowl-like cavity, said cylindrical cavity being configured for substantially centering said base unit on said upper surface of said stirrer hotplate, said base unit being solid; and a dish-like insert comprising at least one internally curved surface region capable of seating and locating about a portion of a reaction vessel, and a externally curved surface region configured to mate with said bowl-like cavity of said base unit to define a gap between said externally curved surface region and said bowl-like cavity, said dish-like insert being solid, wherein said insert is capable of being removeably accommodated within said base unit.

21. The adapter block as claimed in claim 20 further comprising means for inhibiting displacement of said device relative to said stirrer hotplate.

* * * * *